United States Patent
Zorn

(10) Patent No.: US 11,492,204 B2
(45) Date of Patent: Nov. 8, 2022

(54) HAUL LINE AND METHOD OF USE

(71) Applicant: Adam P. Zorn, Wauwatosa, WI (US)

(72) Inventor: Adam P. Zorn, Wauwatosa, WI (US)

( * ) Notice: Subject to any disclaimer, the term of this patent is extended or adjusted under 35 U.S.C. 154(b) by 389 days.

(21) Appl. No.: 15/929,447

(22) Filed: May 3, 2020

(65) Prior Publication Data

US 2021/0339958 A1 Nov. 4, 2021

(51) Int. Cl.
*B65G 7/12* (2006.01)
*A01M 31/02* (2006.01)

(52) U.S. Cl.
CPC .............. *B65G 7/12* (2013.01); *A01M 31/02* (2013.01)

(58) Field of Classification Search
CPC ....... B65G 7/12; A45F 2005/006; B66C 1/12; B66C 1/14; A01M 31/006; A47D 13/086
USPC ........ 294/149, 159, 162; 224/103, 580, 268, 224/269
See application file for complete search history.

(56) References Cited

U.S. PATENT DOCUMENTS

| | | | | |
|---|---|---|---|---|
| 1,405,052 A * | 1/1922 | Maher | ....................... | B66C 1/14 294/150 |
| 3,718,947 A * | 3/1973 | Huber | ....................... | B66C 1/14 24/298 |
| 5,277,347 A | 1/1994 | Savard | | |
| 5,423,292 A * | 6/1995 | Hall | ..................... | A47D 13/086 119/770 |
| 5,655,803 A * | 8/1997 | Tacoronte | ............. | F41B 5/1461 294/82.11 |
| 8,132,302 B2 * | 3/2012 | Wilkinson | ............... | H02G 3/30 224/904 |
| 8,590,116 B2 * | 11/2013 | Dahl | ........................ | D07B 1/02 294/74 |
| 9,277,744 B1 * | 3/2016 | Sanders | ............... | A01M 31/006 |
| 9,873,005 B1 * | 1/2018 | Williams | ............... | A62B 35/00 |

(Continued)

FOREIGN PATENT DOCUMENTS

| CN | 203393510 U | 1/2014 |
|---|---|---|
| CN | 203922566 U | 11/2014 |
| CN | 105780556 B | 5/2019 |

OTHER PUBLICATIONS

Screen capture from YouTube video clip entitled "3 sticks.MP4," 2 pages, uploaded on Feb. 17, 2013 by user "cbigbear1." Retrieved from Internet: <https://youtu.be/zeEHzLTtTIM>.

(Continued)

*Primary Examiner* — Dean J Kramer
(74) *Attorney, Agent, or Firm* — Moreno IP Law LLC

(57) ABSTRACT

A haul line may comprise a primary rope having a proximal attachment mechanism attached to the primary rope at a proximal end of the primary rope. The haul line further comprises at least one secondary rope attached to the primary rope, each of the at least one secondary ropes being attached at a first end of the secondary rope to the primary rope and having a secondary attachment mechanism deployed at a second end of the secondary rope. The haul line further comprises a securing mechanism attached to the primary rope in between the primary attachment mechanism and a point along the primary rope where a closest secondary rope of the at least one secondary rope is attached to the primary rope. The securing mechanism is configured to receive at least a portion of each secondary rope or secondary attachment mechanism.

13 Claims, 6 Drawing Sheets

(56) References Cited

U.S. PATENT DOCUMENTS

2006/0225669 A1* 10/2006 Fontaine .............. A47D 13/086
                                                    119/770
2017/0150804 A1*  6/2017 Belzner .................... A45F 5/02
2018/0192635 A1   7/2018 Wheelington

OTHER PUBLICATIONS

Home of the Stick Talons. Website [online]. 1997 [retrieved on May 22, 2019]. Retrieved from the Internet: <URL: www.mobilehuntinggear.com>.

* cited by examiner

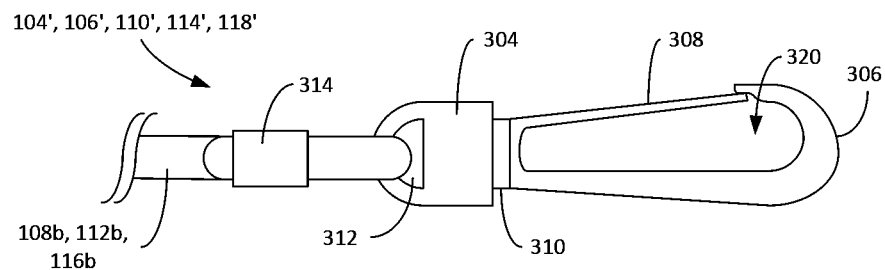
FIG. 3
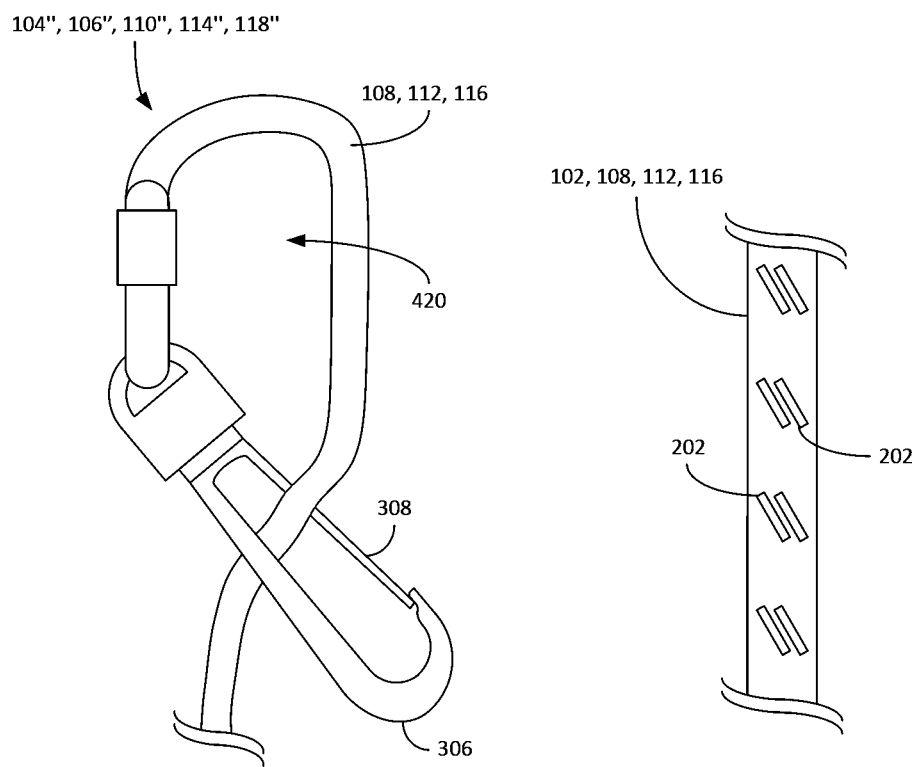
FIG. 4
FIG. 2

HAUL LINE AND METHOD OF USE

FIELD

The present disclosure relates generally to haul lines and, in particular, to a haul line having a primary rope, at least one secondary rope and a securing mechanism configured to receive at least a portion of each secondary rope or a secondary attachment mechanism.

BACKGROUND

Portable tree stands are well-known in the realm of hunting. Such tree stands permit a hunter to ascend a tree and temporarily secure the tree stand to the tree. However, in order to ascend the tree a sufficient amount (e.g., 25 or more feet), the hunter may also need to temporarily deploy one or more so-called climbing sticks that make it easier for the hunter to climb the tree. Further still, in addition to a weapon, the hunter may have other gear that would be useful while positioned in the tree stand.

In these situations, the hunter will typically attach a series of climbing sticks to the tree at successively greater heights. For each successive climbing stick, the hunter will often have to descend from the tree, acquire another climbing stick and once again ascend the tree to attach the next climbing stick. This cycle must be repeated as necessary to reach the desired height. A further descend-ascend cycle may be required to obtain and deploy the tree stand once the desired height has been achieved. These repeated cycles make the setup of the portable tree stand time consuming, which may prevent the hunter from reaching a desirable position in a timely manner Further, such repeated cycles result in excess movement and sounds, thereby increasing the likelihood that the hunter will be detected by his/her quarry.

Haul lines for use by hunters are known in the art, though such use is typically in conjunction with tree stands and climbing aids that are already deployed. Typically, hunters assemble all of their required gear and ascend a tree (via climbing aids that are already deployed) to a tree stand (that is also already deployed) with the haul line in hand. Once positioned in the tree stand, the hunter can then use the haul line to lift all of the assembled gear (typically including at least a weapon) up to the tree stand. While feasible, this approach does not permit the temporary setup of a portable tree stand and is thus not feasible for such situations. Further, hauling up all of the necessary gear in one attempt via a haul line often presents difficulty due to weight and/or bulkiness of the gear being hauled up.

Thus, innovations that facilitate the use of portable, temporary tree stands while overcoming the above-described limitations would represent a welcome advance in the art.

SUMMARY

The above-described shortcomings are overcome through the provision of a haul line in accordance with the instant disclosure. In particular, a haul line may comprise a primary rope having a proximal attachment mechanism attached to the primary rope at a proximal end of the primary rope. The haul line further comprises at least one secondary rope attached to the primary rope, each of the at least one secondary ropes being attached at a first end of the secondary rope to the primary rope and having a secondary attachment mechanism deployed at a second end of the secondary rope. The haul line further comprises a securing mechanism attached to the primary rope in between the primary attachment mechanism and a point along the primary rope where a closest secondary rope of the at least one secondary rope is attached to the primary rope. The securing mechanism is configured to receive at least a portion of each secondary rope or secondary attachment mechanism.

In an embodiment, the primary rope may be between 20-40 feet in length, preferably between 30-35 feet in length. The primary and/or at least one secondary rope may be fabricated from paracord and may include a reflective component. Further, the haul line may comprise a distal attachment mechanism attached to a distal end of the primary rope.

In an embodiment, the haul line may comprise a plurality of secondary ropes. For example, the haul line may comprise anywhere from two to ten secondary ropes, and may preferably comprise four to six secondary ropes. The secondary ropes may be equally spaced along the length of the primary rope, and each secondary rope may have a predetermined length. For example, each secondary rope may be between 2-18 inches long, and may preferably be between 6-12 inches long.

In another embodiment, a method of using a haul line includes securing a primary rope of the haul line to a user via a proximal attachment mechanism attached to the primary rope at a proximal end of the primary rope, wherein the haul line further includes at least one secondary rope attached to the primary rope, each of the at least one secondary rope being attached at a first end of the secondary rope to the primary rope and having a secondary attachment mechanism deployed at a second end of the secondary rope, and wherein the haul line further includes a securing mechanism attached to the primary rope in between the primary attachment mechanism and a point along the primary rope where a closest secondary rope of the at least one secondary rope is attached to the primary rope, the securing mechanism configured to receive at least a portion of each secondary rope or secondary attachment mechanism. The method further comprises taking up a portion of the primary rope such that an item, attached to a selected secondary attachment mechanism of a selected secondary rope, may be detached from the selected secondary attachment mechanism. Finally, after detaching the item, the method comprises securing at least a portion of the initial secondary rope or the initial secondary attachment mechanism to the securing mechanism.

BRIEF DESCRIPTION OF THE DRAWINGS

The foregoing and other features and advantages will be discussed in detail in the following non-limiting description of specific embodiments in connection with the accompanying drawings, in which:

FIG. 2 is a detailed view of an embodiment of a primary and/or secondary rope in accordance with the instant disclosure;

FIGS. 3-5 are respective detailed views of first, second and third embodiments of a proximal, distal and/or secondary attachment mechanism in accordance with the instant disclosure;

DETAILED DESCRIPTION OF THE PRESENT EMBODIMENTS

Figure 1:
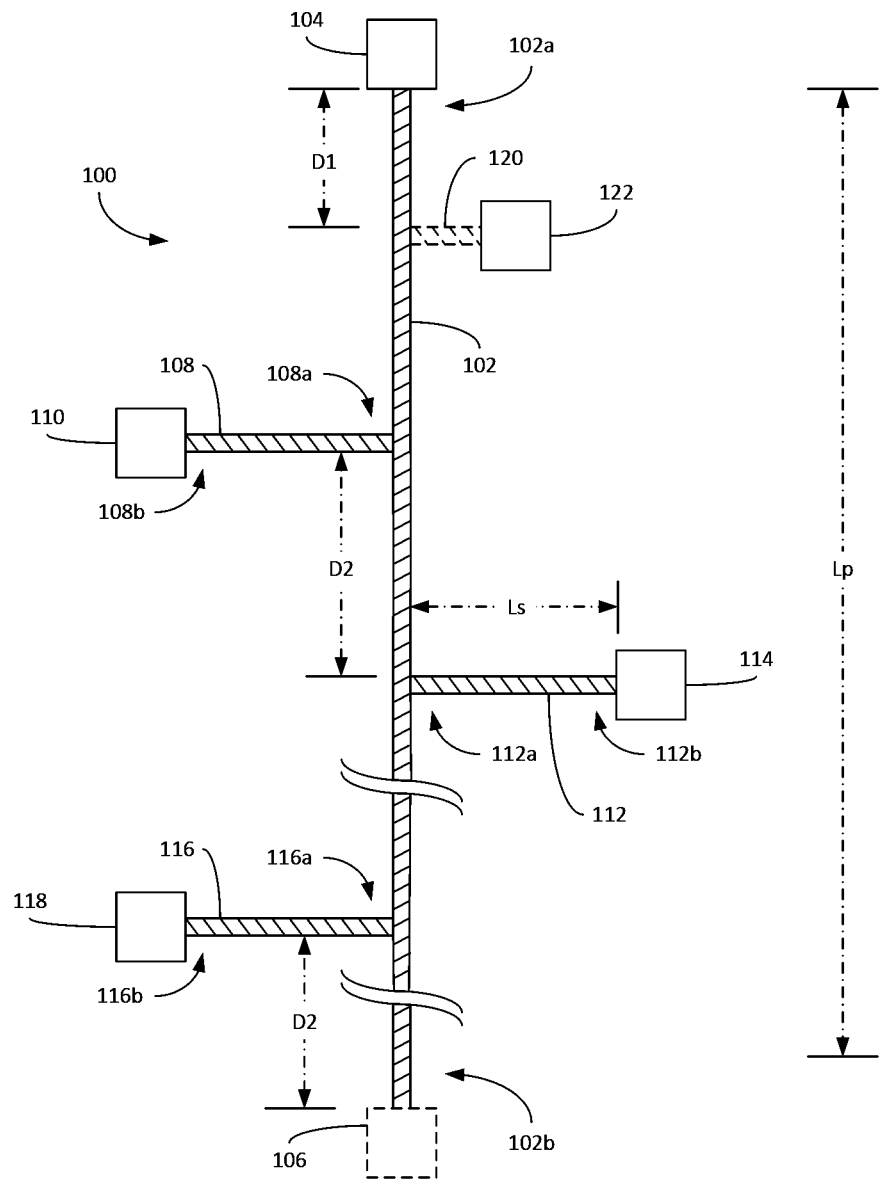
FIG. 1 is a schematic illustration of a haul line in accordance with the instant disclosure.

Referring now to FIG. 1, a haul line 100 in accordance with the instant disclosure is schematically illustrated. As shown, the haul line 100 comprises a primary rope 102 and at least one secondary rope 108, 112, 116 (three, in the illustrated example) attached to the primary rope 102. In general, the haul line 100 may comprise any number of secondary ropes 108, 112, 116 greater than one. However, in an embodiment, the haul line 100 may comprise between two and ten secondary ropes and, preferably, may comprise between four and six secondary ropes. More broadly, the number of secondary ropes 108, 112, 116 may be selected at least equal to the anticipated maximum number of items to be attached to the haul line 100. Regardless of the number of secondary ropes employed, each secondary rope 108, 112, 116 is attached to the primary rope 102 at a first end 108a, 112a, 116a of the secondary rope.

As further shown, the primary rope 102 includes a proximal attachment mechanism 104 attached to the primary rope 102 at a proximal end 102a thereof. On the other hand, the primary rope 102 may optionally include (as illustrated by the dashed lines) a distal attachment mechanism 106 attached to the primary rope 102 at a distal end 102b of the primary rope. As used herein, the terms "proximal" and "distal" are referenced relative to a user (e.g., a hunter scaling a tree) of the haul line 100. Thus, the proximal end 102a is that end of the primary rope 102 that is secured to the user during use of the haul line 100, whereas the distal end 102b is that end of the primary rope opposite the proximal end. In a similar manner, each of the secondary ropes 108, 112, 116 comprises a secondary attachment mechanism 110, 114, 118 deployed at a second end 108b, 112b, 116b of the respective secondary rope. In an embodiment, the proximal attachment mechanism 104 is configured to permit the primary rope 102 to be secured to a user of the haul line 100. As used herein, the term "secured" means a removable attachment, including via one or more intervening elements relative to the object to which another object is being attached. Thus, in this case, an object is secured to the user when it is attached directly to the user or via any intervening equipment (e.g., backpack, coat, etc.) carried or worn by the user. In turn, the distal attachment mechanism 106 and the secondary attachment mechanisms 110, 114, 118 are configured to permit attachment of items (e.g.—in the context of a hunter—climbing sticks, tree stand, etc.) to the secondary lines 108, 112, 116. While it is possible that the proximal, distal and secondary attachment mechanisms may all have the same configuration, it is appreciated that this is not a requirement, i.e., any one or more of the attachment mechanisms 104, 106, 110, 114, 118 may be configured differently from the others. Various embodiments for the attachment mechanisms 104, 106, 110, 114, 118 are described below with further reference to FIGS. 3-5.

Figure 6:
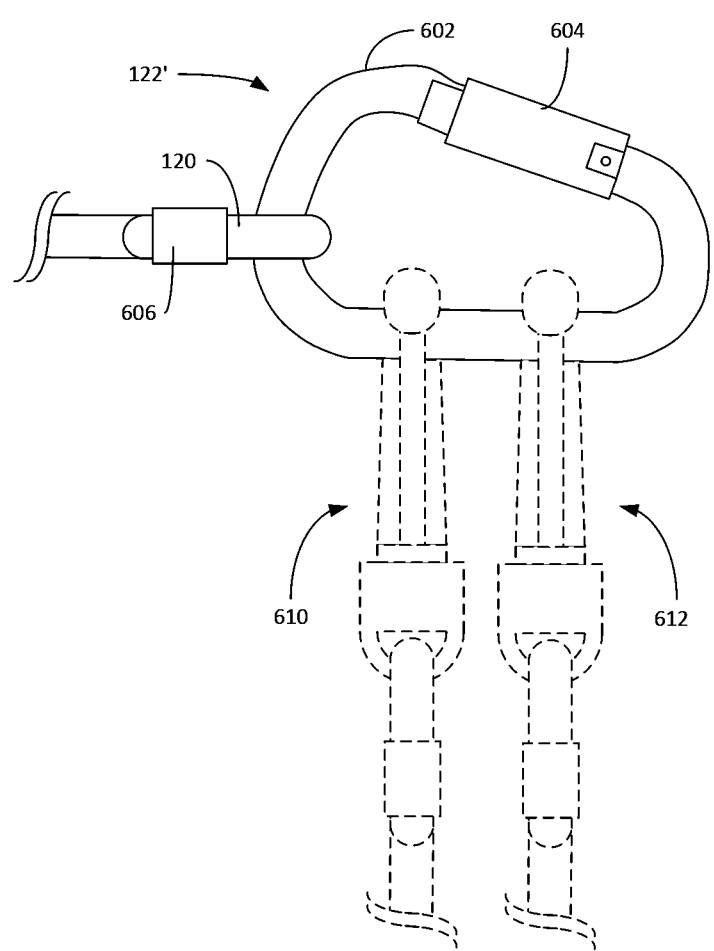
FIGS. 6-8 are respective detailed views of first through third embodiments of a securing mechanism in accordance with the instant disclosure.
Figure 7:
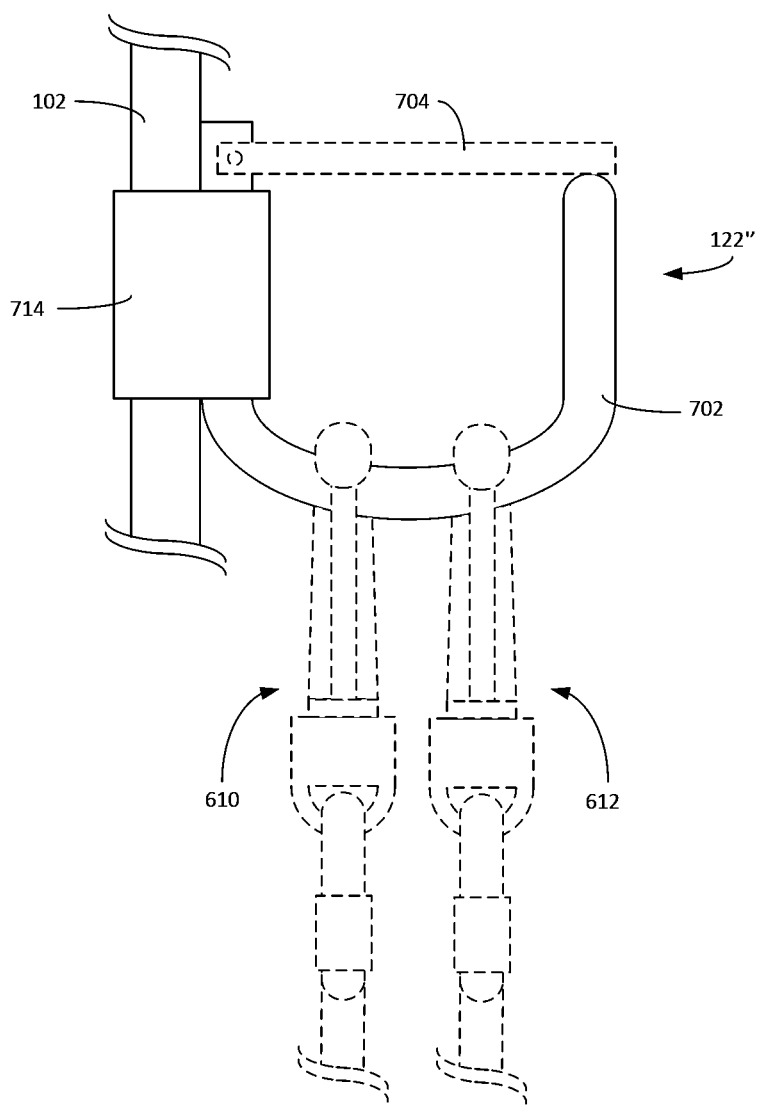

The haul line additionally comprises a securing mechanism 122 attached to the primary rope 102. More particularly, as shown in FIG. 1, the securing mechanism 122 is attached to the primary rope 102 at a point along the primary rope between the proximal attachment mechanism 104 and a closest secondary rope (relative to the proximal attachment mechanism). For example, in the illustrated embodiment, the closest secondary rope is labeled with reference numeral 108. As further shown in FIG. 1, the securing mechanism 122 may be attached to the primary rope 102 via an optional length of rope 120. Alternatively, the securing mechanism 122 may be directly attached to the primary rope 102. Exemplary embodiments for the securing mechanism 120 are illustrated in FIGS. 6 and 7, described in further detail below.

In general, the secondary ropes 108, 112 116 may be attached to the primary rope using any conventional means. For example, the secondary ropes 108, 112 116 may be knotted, spliced or sewn onto the primary rope 102. Alternatively, devices such as rope clamps or rope grabs may be used for this purpose. Regardless of the attachment method used, the attachment of the secondary ropes 108, 112 116 to the primary rope 102 should be sufficient to withstand a maximum anticipated load to be placed on the secondary ropes.

In a presently preferred embodiment, both the primary and secondary ropes 102, 108, 112, 116 are fabricated from nylon parachute cord (often referred to as "paracord") or a similarly strong and lightweight rope material. However, it is understood that other, typical rope materials (e.g., other polymer materials, hemp fibers, etc.) may be used for this purpose as determined by the typical loads and anticipated use environment. In an embodiment, and with reference to FIG. 2, the primary and/or secondary ropes 102, 108, 112, 116 may include a reflective material 202 woven into or otherwise incorporated into the rope. For example, the reflective material 202 may comprise fibers that are selected to reflect visible light, or even substantially invisible radiation such as near infrared wavelengths.

FIG. 1 further illustrates various parameters (D1, D2, Ls, Lp) defining the haul line 102. A first parameter, D1, defines a distance that the securing mechanism 122 may be attached to the primary rope 102 away from the proximal attachment mechanism 104. Preferably, D1 is selected such that a user is able to readily reach the securing mechanism 122 without excessive movement when the primary rope 102 is secured to the user. Thus, in an embodiment, D1 may be in the range of 2 to 24 inches, preferably in the range of about 6-8 inches, though it is appreciated that other values for D1 may be employed. A second parameter, D2, establishes a separation distance between attachment points of the secondary ropes 108, 112, 116 to the primary rope 102, as well as a separation distance between the most distal secondary rope 116 and the distal attachment mechanism 106. A third parameter, Lp, defines the length of the primary rope 102 from its proximal end 102a to its distal end 102b. In one embodiment, the primary rope may be between 15-40 feet in length, preferably between 20-35 feet in length. Similarly, a fourth parameter, Ls, defines the length of the secondary ropes 108, 112, 116. In one embodiment, each secondary rope may be between 2-18 inches long, and may preferably be between 4-12 inches long. Although the illustration of D2 and Ls in FIG. 1 may suggest that these parameters are used uniformly for the haul line 100, this is not a requirement. That is, the spacing between secondary lines could vary and, likewise, the length of any given secondary rope could differ from the lengths of the other secondary ropes.

In general, it is desirable to select the values of the various parameters illustrated in FIG. 1 (D1, D2, Ls, Lp) so as to minimize the likelihood of any items of equipment attached to the secondary ropes contacting each other, thereby creating unwanted noise. For example, assuming a maximum expect equipment length (MEEL) is known, D2 may be selected so as to satisfy the following relation:

$$MEEL < D2 \leq MEEL + Ls$$

That is, the distance between secondary ropes (D2) is preferably selected to be larger than the maximum expected equipment length plus the length of the secondary ropes.

Furthermore, the length of the primary rope may be selected based on the maximum expected equipment length and the anticipated maximum number of items (n) to be attached to the secondary ropes. For example:

$$n*\text{MEEL} < Lp \leq n*(\text{MEEL}+Ls)$$

In this manner, items of equipment are less likely to contact each other without making the overall length of the primary rope (Lp) unnecessarily long. As an example, in the context of a hunting equipment, assume that the haul line will be used to carry up to six climbing sticks each having a maximum length of three feet. Further, assume that Ls for each secondary rope is one foot. In this case the overall length of the primary rope may between approximately 18-24 feet, with separation between the secondary ropes between approximately 3-4 feet.

Figure 5:
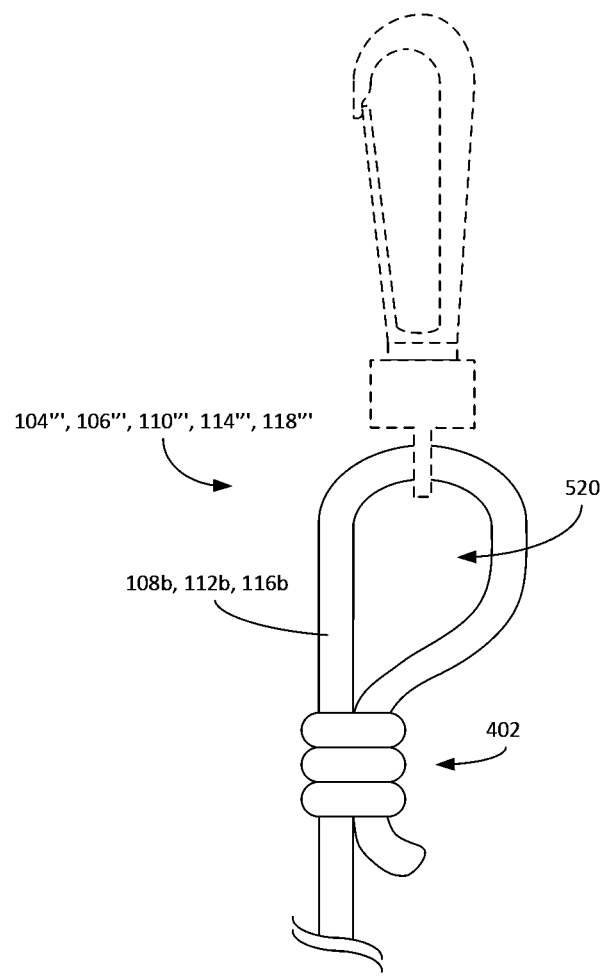

Referring now to FIGS. 3-5, respective detailed views of various embodiments of a proximal, distal and/or secondary attachment mechanism 104, 106, 110, 114, 118 in accordance with the instant disclosure are illustrated. For example, FIG. 3 illustrates a first embodiment of an attachment mechanism 104', 106', 110', 114', 118' comprising a hook or clip 306 attached to a base 304 via a swivel 310 that permits full 360° rotation of the clip 306. As shown, the clip 306 may also include a gate 308 that may be flexed inward for securing items to the clip 306. In this embodiment, an eyelet or opening 312 is provided in the base 204 permitting passage of a second end 108b, 112b, 116b of a secondary rope 108, 112, 116 therethrough. A rope clamp or compression fitting 314 is provided to securely create a loop to secure the base 304 to the secondary rope 108, 112, 116. As known in the art, the clip 306 and gate 308 establish a closed loop 320 that may be used to removably attach an item to the secondary rope 108, 112, 116. In a presently preferred embodiment, the base 304/clip 306/gate 308/swivel 310 components are formed of a plastic material to minimize any rattling or noise that may generated by metal components.

A second embodiment of an attachment mechanism 104", 106", 110", 114", 118" is illustrated in FIG. 4 and utilizes the swivel clip embodiment of FIG. 3. In this case, the secondary rope is passed through clip 306/gate 308 to create an adjustable closed loop 420 that once again permits the temporary attachment of an item to the secondary rope 108, 112, 116. Further still, a third embodiment of an attachment mechanism 104''', 106''', 110''', 114''', 118''' is illustrated in FIG. 5. In this embodiment, a slip knot 402 is formed in the second end 108b, 112b, 116b of a secondary rope 108, 112, 116. In this manner, an adjustable closed loop 520 (similar to the closed loop 420 of FIG. 4) is formed. As shown by the dotted lines, a swivel clip of the type described above relative to FIG. 3 may be optionally attached to the loop formed in the secondary rope 108, 112, 116. This embodiment has the advantage of not requiring a separate device (e.g., a swivel clip) to form the attachment mechanism, which may instead be formed out the secondary rope 108, 112, 116 itself, while still permitting the use of a swivel clip or similar device.

Referring now to FIGS. 6-9, first through third embodiments of a securing mechanism 122 in accordance with the instant disclosure are illustrated. Generally, the securing mechanism 122 is configured to permit at least a portion of one or more of the secondary ropes 108, 112, 116 or secondary attachment mechanisms 110, 114, 118 to be secured thereto, thereby preventing the free movement of the secondary ropes/secondary attachment mechanisms. As described in further detail below, as items are detached from the one or more secondary ropes 108, 112, 116, the secondary ropes may be gathered up by the user and secured to the securing mechanism 122.

For example, in the first embodiment shown in FIG. 6, the securing mechanism 122' is embodied by a carabiner 602 having, in the illustrated example, an inwardly opening locking gate 604. Though a locking gate 604 is illustrated in FIG. 6, it is appreciated that other types of gates may be employed where carabiners are employed as the securing mechanism 122'. As further shown in FIG. 6, the carabiner 602 is attached to the primary rope (not shown) via the short length of rope 120 having a loop formed therein and maintained by a suitable rope claim 606 or the like. As known in the art, the locking carabiner 602 provides the ability to securely attach items, and example of this is illustrated in FIG. 6 where secondary attachment mechanisms 610, 612 in the form of swivel clips are illustrated as being attached to the securing mechanism 122'. An advantage of the illustrated combination of the carabiner 602 and swivel clips is that the user can utilize either mechanism to secure the secondary ropes to the securing mechanism 122', i.e., the user can open the locking gate 604 to attach the swivel clips or compress the gates 308 on the swivel clips to attach them to the carabiner 602.

An alternate embodiment of a securing mechanism 122" is illustrated in FIG. 7. In this case, the securing mechanism 122" comprises a U-shaped, metal or plastic hook 702 that is directly secured to the primary rope 102 via a compression fitting 714 or the like. This configuration permits secondary ropes 108, 112, 116 and/or secondary attachment mechanisms 110, 114, 118 to be hung on the U-shaped hook 702, e.g., the swivel clips 610, 612 illustrated in FIG. 7. Optionally, the U-shaped hook 702 may include a spring-loaded gate 704 as shown in order to better assure that the secondary ropes/secondary attachment mechanisms do not inadvertently slip off of the U-shaped hook 702.

Figure 8:
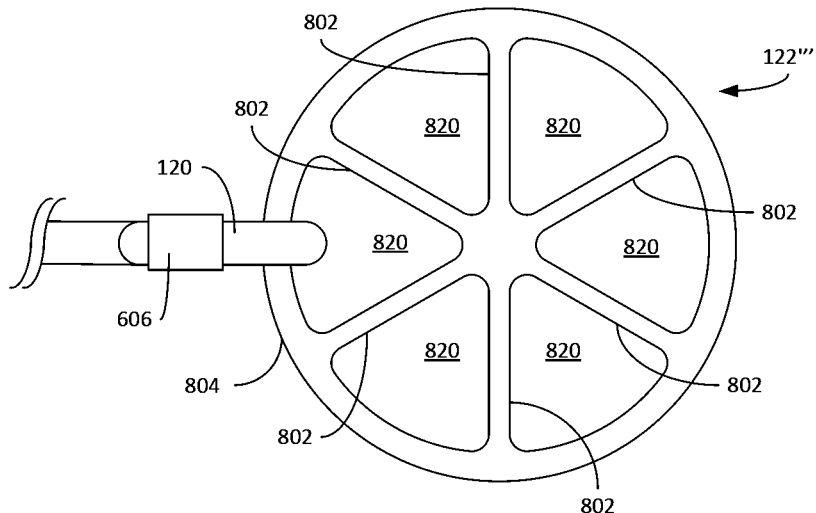

Yet another alternative embodiment of a securing mechanism 122''' is illustrated in FIG. 8. In this case, the securing mechanism 122''' comprises a spoked ring structure in which separate spokes 802 disposed on the inside of the ring 804 define separate closed loops 820 that may be used to receive corresponding ones of the secondary attachment mechanisms 110, 114, 118. Similar to the embodiment shown in FIG. 6, the ring 804 may attached to the primary rope (not shown) via the short length of rope 120 attached to one of the closed loops 820. Alternatively, the embodiment illustrated in FIG. 7 may be employed in which the ring 804 is directly coupled to the primary rope via a suitable compression fitting or the like. In the illustrated example, six separate spokes 802 define six separate closed loops 820. However, it is appreciated that a greater or lesser number of spokes/closed loops may be provided as a matter of design choice. In a simplest case, the internal spokes 802 may be eliminated altogether such that only the ring 804 is provided.

In a presently preferred embodiment, the securing mechanisms 122', 122", 122''' illustrated in FIGS. 6-8 may all comprise a coating of rubber or similar material to reduce the potential for noise resulting from contact of the secondary attachment mechanisms 110, 114, 118 with the securing mechanisms 122', 122", 122'''.

Figure 9:
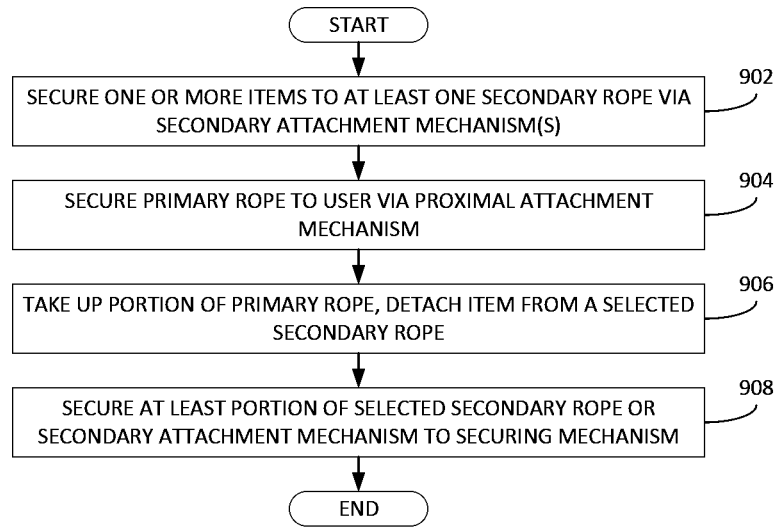
FIG. 9 is a flow chart illustrating a method of use of a haul line in accordance with the instant disclosure.

Referring now to FIG. 9, a flowchart illustrates a method of use of the various haul line embodiments described herein. Beginning at block 902, a user secures one or more items to at least one of the secondary ropes via a corresponding secondary attachment mechanism. For example, in the case of a hunter, such items might include climbing sticks, a tree stand, backpack, weapon, etc. Additionally, at step 904, the primary rope may be secured to the user. For example, this may be done by using the proximal attachment mechanism to secure the primary rope to the user's arm or leg, belt, backpack, etc. Thereafter, as needed, the user can take up a portion of the primary rope at block 906 in order to remove any desired item from a selected secondary rope. Thus, with reference to a hunting scenario once again, as a hunter ascends a tree, he/she can take up the primary rope in order to reach and remove a climbing stick or tree stand and deploy the retrieved item on the tree. Having removed an item from a selected secondary rope, the user can then, at block 908, secure at least a portion of the selected secondary rope or the corresponding secondary attachment mechanism to the securing mechanism. In this manner, the user is able to continually retrieve any necessary items without the need for back-and-forth movements. Additionally, by securing the secondary ropes to the securing mechanism, the user is able to prevent entanglements or other difficulties that might arise by allowing the secondary ropes to move freely.

While particular preferred embodiments have been shown and described, those skilled in the art will appreciate that changes and modifications may be made without departing from the instant teachings. For example, while the methods of attaching the secondary ropes to the primary rope suggest permanent attachment, it is appreciated that this is not a requirement. That is, it may be desirable to allow the secondary ropes to be releasably attached to the primary rope (via, for example, a mobile rope grab) such that the user can customize spacing between the secondary ropes. Furthermore, the haul line described herein has been described for the use for hauling hunting equipment into trees, it is understood that the haul line described herein may be used for a variety of purposes. It is therefore contemplated that any and all modifications, variations or equivalents of the above-described teachings fall within the scope of the basic underlying principles disclosed above and claimed herein.

What is claimed is:

1. A haul line, comprising:
    a primary rope having a proximal attachment mechanism attached to the primary rope at a proximal end of the primary rope;
    a plurality of secondary ropes attached to the primary rope, each of the plurality of secondary ropes being attached at a first end of the secondary rope to the primary rope and having a secondary attachment mechanism deployed at a second end of the secondary rope; and
    a securing mechanism attached to the primary rope in between the proximal attachment mechanism and a point along the primary rope where a closest secondary rope of the plurality of secondary ropes is attached to the primary rope, the securing mechanism configured to receive at least a portion of each secondary rope or secondary attachment mechanism.

2. The haul line of claim 1, further comprising:
    a distal attachment mechanism attached to the primary rope at a distal end of the primary rope opposite the proximal end.

3. The haul line of claim 1, wherein the primary rope is between 20 and 40 feet in length.

4. The haul line of claim 3, wherein the primary rope is between 30 and 35 feet in length.

5. The haul line of claim 1, wherein the primary rope includes a reflective component.

6. The haul line of claim 1, wherein the primary rope and at least one secondary rope are formed of paracord.

7. The haul line of claim 1, wherein the plurality of secondary ropes comprises two to ten secondary ropes.

8. The haul line of claim 7, wherein the plurality of secondary ropes comprises four to six secondary ropes.

9. The haul line of claim 1, wherein the plurality of secondary ropes are equally spaced along a length of the primary rope.

10. The haul line of claim 1, wherein each of the plurality of secondary ropes is a predetermined length.

11. The haul line of claim 10, wherein the predetermined length is between 2-18 inches.

12. The haul line of claim 10, wherein the predetermined length is between 6-12 inches.

13. A method of using a haul line, comprising:
    securing a primary rope to a user via a proximal attachment mechanism attached to the primary rope at a proximal end of the primary rope, wherein the haul line further includes a plurality of secondary ropes attached to the primary rope, each of the plurality of secondary ropes being attached at a first end of the secondary rope to the primary rope and having a secondary attachment mechanism deployed at a second end of the secondary rope, and wherein the haul line further includes a securing mechanism attached to the primary rope in between the proximal attachment mechanism and a point along the primary rope where a closest secondary rope of the plurality of secondary ropes is attached to the primary rope, the securing mechanism configured to receive at least a portion of each secondary rope or secondary attachment mechanism;
    taking up a portion of the primary rope such that an item, attached to a selected secondary attachment mechanism of a selected secondary rope, may be detached from the selected secondary attachment mechanism; and
    after detaching the item, securing at least a portion of the initial secondary rope or the initial secondary attachment mechanism to the securing mechanism.

* * * * *